(No Model.)

L. T. STANLEY.
GALVANIC BATTERY.

No. 419,730. Patented Jan. 21, 1890.

Witnesses:
Raphael Netter
Ernest Hopkinson

Inventor
Lucius T. Stanley
by
Duncan, Curtis & Page
Attorneys.

UNITED STATES PATENT OFFICE.

LUCIUS T. STANLEY, OF BROOKLYN, NEW YORK, ASSIGNOR TO THE STANLEY ELECTRIC COMPANY, OF PHILADELPHIA, PENNSYLVANIA.

GALVANIC BATTERY.

SPECIFICATION forming part of Letters Patent No. 419,730, dated January 21, 1890.

Original application filed January 12, 1889, Serial No. 296,199. Divided and this application filed February 25, 1889. Renewed November 16, 1889. Serial No. 330,531. (No model.)

*To all whom it may concern:*

Be it known that I, LUCIUS T. STANLEY, a citizen of the United States, residing at Brooklyn, in the county of Kings and State of New York, have invented certain new and useful Improvements in Galvanic Batteries, of which the following is a specification, this application being a division of an application filed by me January 12, 1889, Serial No. 296,199.

This invention is an improvement in galvanic batteries, more particularly those designed for use with portable faradic batteries or induction-coils for therapeutical purposes, but useful and applicable to all other purposes to which batteries are applied.

The object of the invention is to produce in the smallest possible compass an economical sealed or liquid-tight battery of great power; and it consists in a battery one of the electrodes of which is a carbon cell provided with an annular cover, into which an insulating-plug carrying the zinc electrode is inserted.

The battery is shown in the accompanying drawings.

Figure 1:
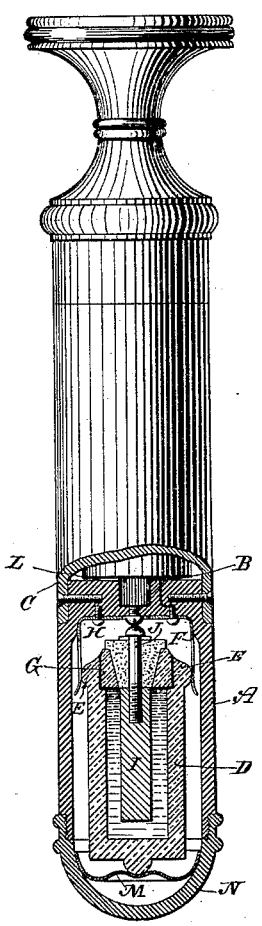
Figure 2:
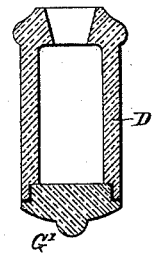

Figure 1 is a view in side elevation and part section of an instrument with which the battery is especially designed for use, the battery in central section being shown as associated therewith. Fig. 2 is a central section of a modified form of the battery-cell.

The battery consists of a molded carbon cup D, preferably enameled or varnished on its exterior surface, except at such points where the conductors of the circuit may be applied to it. In the present instance the battery is secured in a chamber or insulating-casing A, in which are springs F, forming one terminal of the primary of an induction-coil B, secured in a metallic casing C.

L is an electrode forming one terminal of the secondary of the induction-coil, and the casing C forms the other. To adapt the battery to this instrument it is formed with a boss E, which presents a conducting-surface with which the springs F engage when the battery is inserted into the casing and secured by a spring-seat M, attached to a screw-cap N, which closes the open end of the chamber or casing. Into the open top of the carbon cup D is fitted an annular cover G, preferably of carbon, although it may be of hard rubber or similar material, which rests on an offset in the walls of the cell, and which is secured by a cement of sulphur or other suitable material. The part G has a tapering opening to receive a rubber plug or stopper H, to which the zinc electrode I is secured by a screw J. This screw forms the negative terminal of the battery and is designed to encounter one of the terminals of the primary coil when the battery is in position.

The battery is excited by any suitable solution.

The construction of the cell may be modified in certain particulars, as shown in Fig. 2. The top of the cell in this figure is formed integral with the sides and is provided with the tapering perforation and the boss. The bottom G', however, is formed independently and is secured to the sides by cement in the same manner that the cover G is secured in Fig. 1.

Though I have described the battery herein as adapted to a special use and provided with specific devices for connecting it in circuit, it will be understood that my invention is not thus limited, but that the battery may be used for any other purpose and connected in circuit in any way desired.

What I claim is—

1. The closed galvanic battery-cell herein described, composed of a carbon receptacle and a perforated carbon cover, the two being cemented together, as set forth.

2. The closed portable galvanic battery herein described, consisting of a carbon cup forming one electrode and a perforated carbon cover cemented thereto, the exterior of the cell being enameled or coated with insulating material, except on that portion upon which the circuit-terminals are to bear, as set forth.

3. The galvanic battery herein described, consisting of a carbon cell having an annular carbon top or cover secured thereto and insulating plug or stopper fitted into the opening in said cover and carrying a zinc rod.

LUCIUS T. STANLEY.

Witnesses:
C. T. P. BRUNNER,
ERNEST HOWARD HUNTER.